Figure 1:
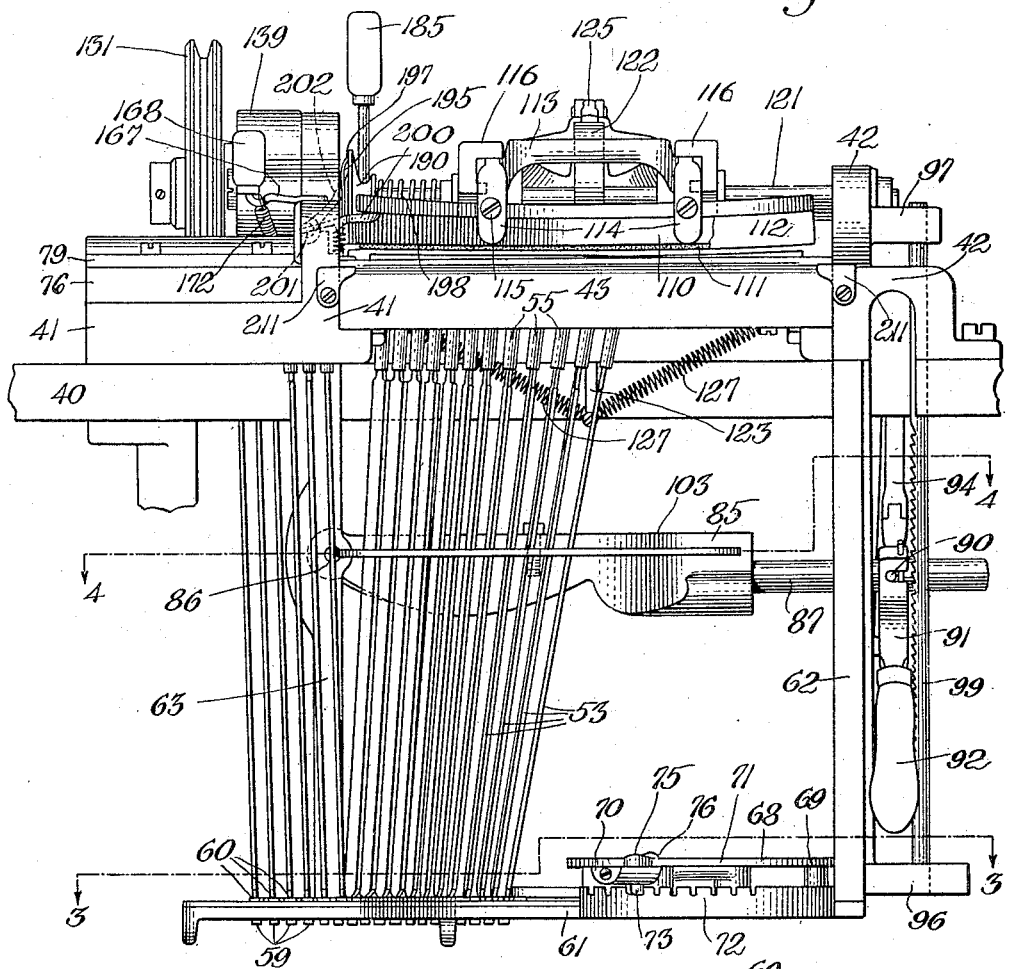

H. W. STEDLER.
MACHINE FOR MARKING BUTTONHOLES.
APPLICATION FILED JULY 25, 1913.

1,206,610.

Patented Nov. 28, 1916.
6 SHEETS—SHEET 1.

Witnesses
A. L. Folsom
E. P. Brannen

Inventor:
Henry W. Stedler
by Wright Brown Quimby May
Attorneys.

H. W. STEDLER.
MACHINE FOR MARKING BUTTONHOLES.
APPLICATION FILED JULY 25, 1913.
1,206,610.
Patented Nov. 28, 1916.
6 SHEETS—SHEET 2.
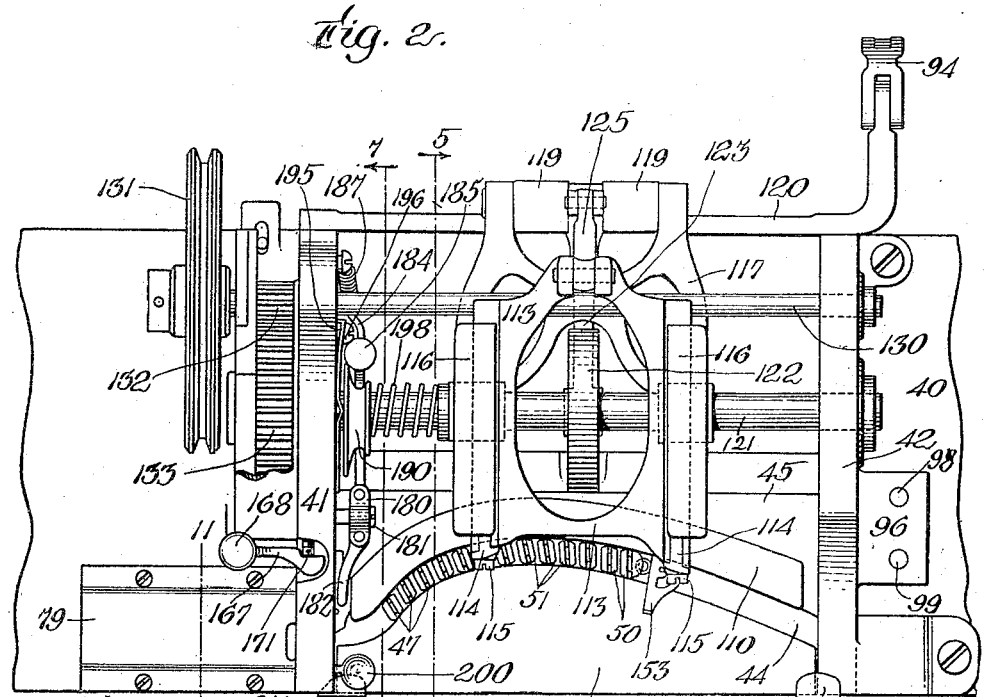
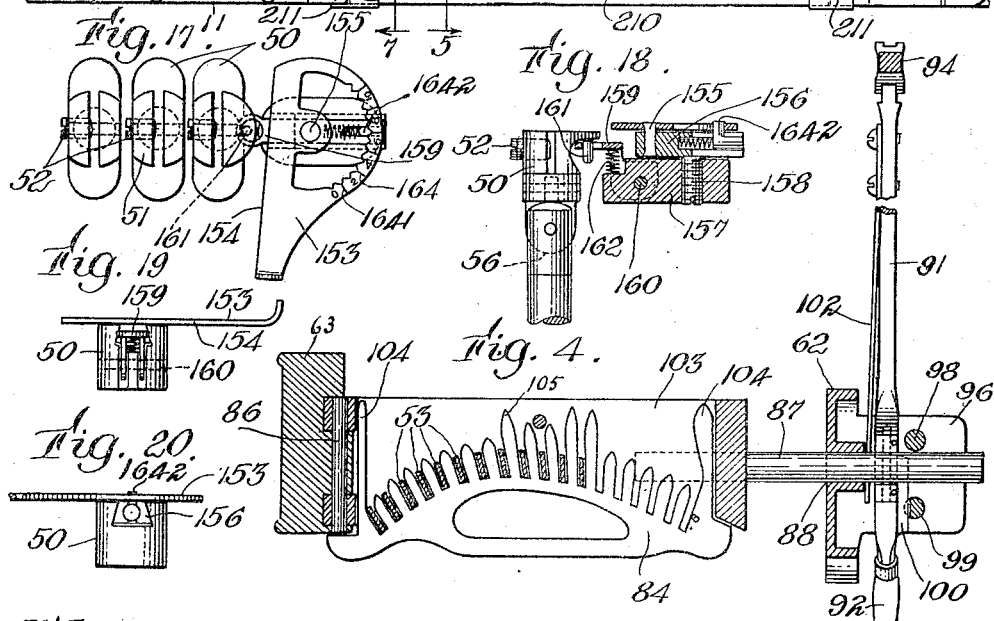
Witnesses:
Inventor:

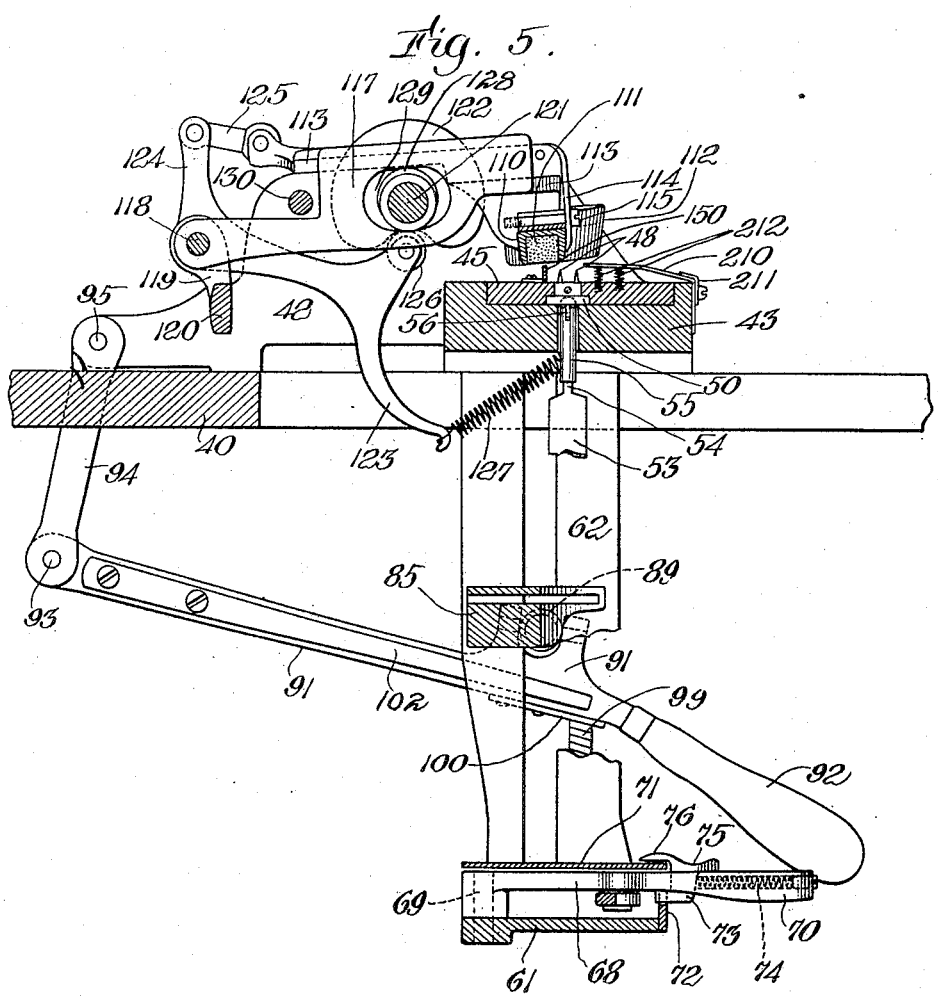
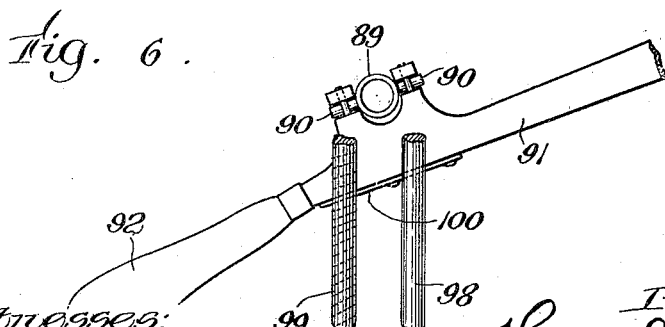

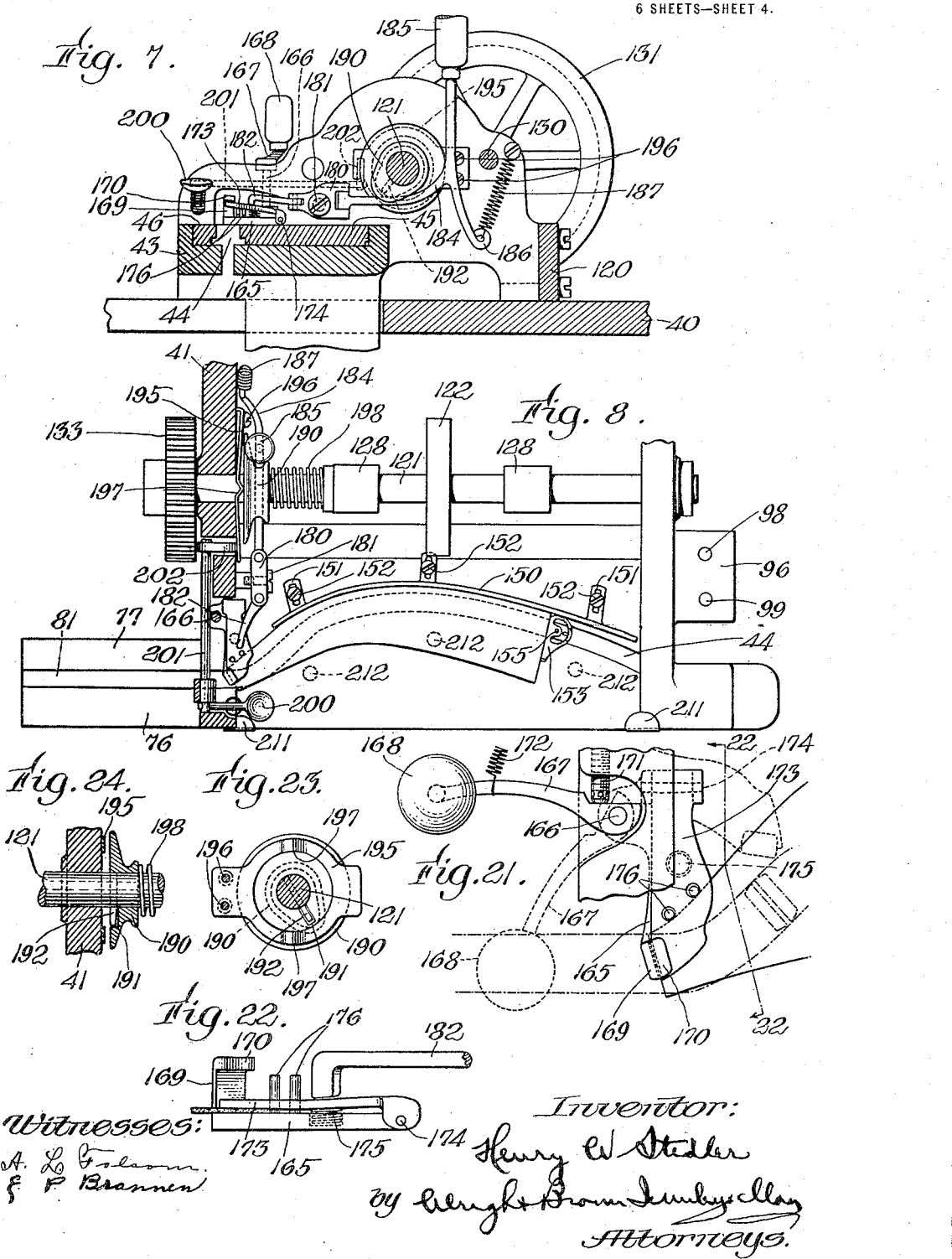

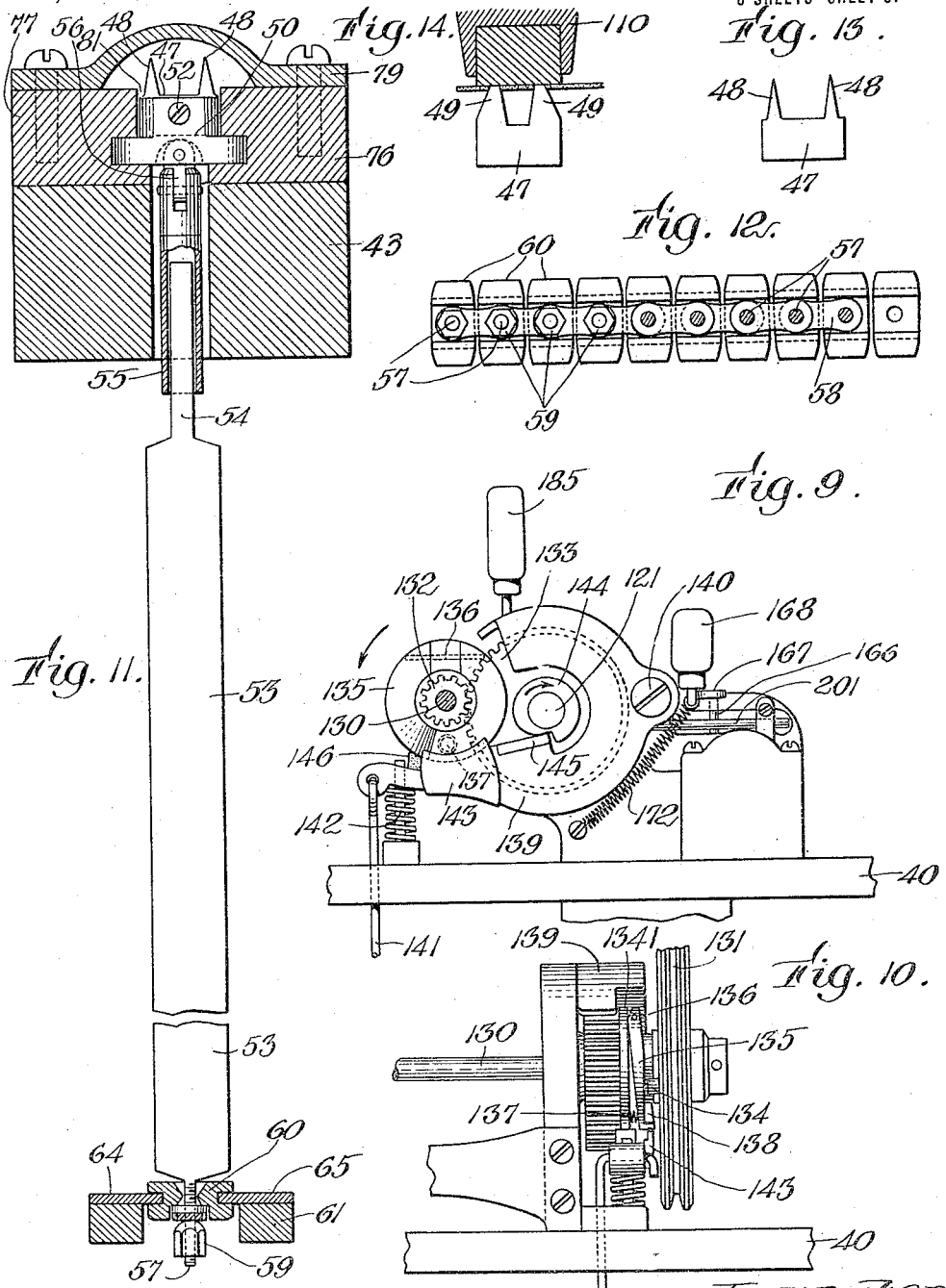

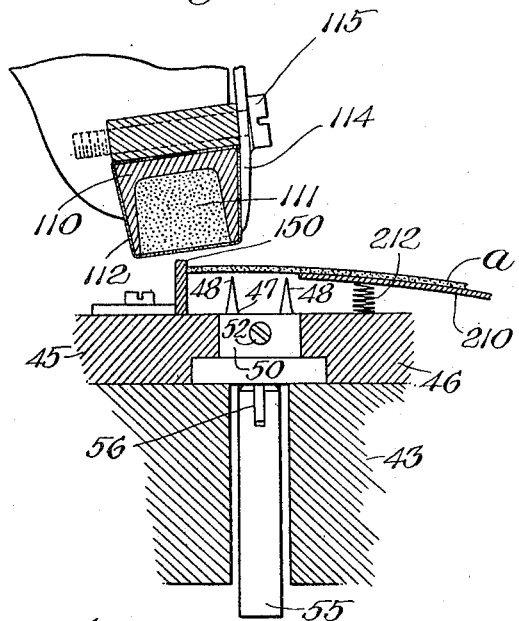
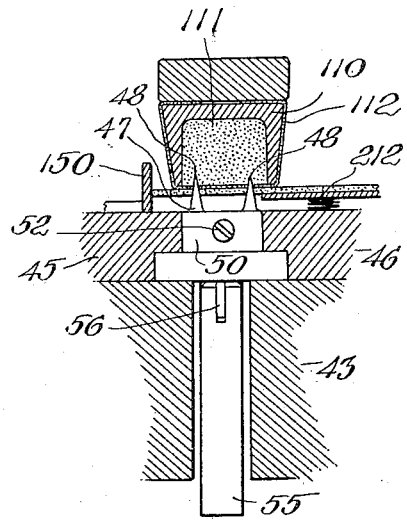
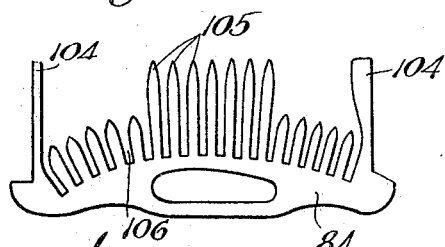
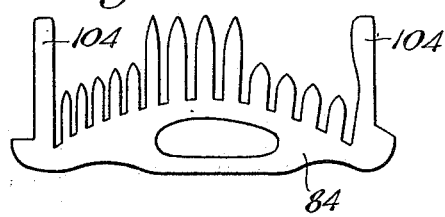
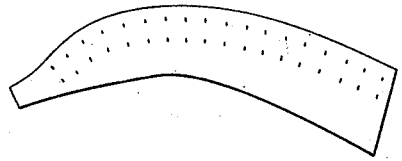
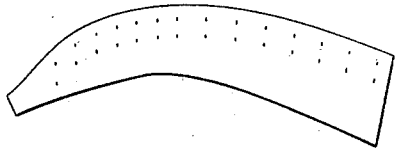

UNITED STATES PATENT OFFICE.

HENRY W. STEDLER, OF BOSTON, MASSACHUSETTS, ASSIGNOR OF ONE-FOURTH TO LAWRENCE H. COX, OF WINTHROP, MASSACHUSETTS.

MACHINE FOR MARKING BUTTONHOLES.

1,206,610.      Specification of Letters Patent.      Patented Nov. 28, 1916.

Application filed July 25, 1913. Serial No. 781,193.

*To all whom it may concern:*

Be it known that I, HENRY W. STEDLER, a subject of the King of Prussia and German Emperor, and residing at Boston, in the county of Suffolk and State of Massachusetts, have invented certain new and useful Improvements in Machines for Marking Buttonholes, of which the following is a specification.

This invention has relation to machines for marking buttonholes in the manufacture of shoes.

Styles and fashions change from time to time in footwear, and in the manufacture of button shoes it is at times necessary to vary the number of the buttonholes and also to vary their location with respect to the edge of the fly in which they are formed. Usually these buttonholes are preferably accurately or evenly spaced, but, according to the dictates of fashion, it may be desirable to arrange the buttonholes in groups or pairs. Likewise it may be desired to have each buttonhole perpendicular to the edge of the fly, or, it may be, at an obtuse angle to the edge. On the other hand, to satisfy some whim of the public, it may be desirable to have some spaces between the buttonholes increased progressively from the lower to the upper end of the fly.

In order to mark the buttonholes in the fly in the various locations which I have thus described, it has been necessary heretofore to employ patterns, one for each style and size of the shoe to be made. With these patterns, an operative manually marks upon the fly the location of each buttonhole.

The object of the present invention is to provide what may be termed a universal machine, by means of which the operator is enabled to mark any desired number of buttonholes for a button shoe of any size or style, so that there may be accomplished by a single machine what has heretofore required the employment of a large number of patterns and manual work by an operative.

In the machine which I have illustrated upon the drawings and shall hereinafter describe in detail as an embodiment of the invention, I employ a plurality of marking devices, the whole number of which will equal the greatest number of buttonholes that will ever be needed in any shoe. Of these marking devices, I select for operation the number which may be needed for marking or indicating the number of buttonholes upon a given fly, the others remaining in an inactive position. By means of pattern-plates or spacers, these marking devices which have been selected are then spaced apart as may be desired and are arranged at such relative angularity as may be needed to fix the desired angular relation of the buttonholes to the edge of the fly. By suitable means, which will hereinafter be described in detail, the marking device thus adjusted and spaced may be still further adjusted for different sizes of shoes of the same style by the manipulation of a single lever so that the markers will be adjusted for similar flies of different lengths. Instead of employing a marker having a single point, such as usually employed, each marker is provided either with an elongated edge or with two separated prongs which form indentations in the fly indicating the ends of the buttonhole, so that the operator, in cutting and sewing the buttonhole, will be accurately guided in so doing.

The illustrated machine is further provided with an adjustable back or edge gage and also with adjustable end gages which coöperate in accurately locating the fly or the upper with respect to the marking devices. The machine is further provided with a bed or platen and with power mechanism controlled by the operator for effecting a relative movement of the marking devices and the bed and platen, by which the engagement of the work or fly with the markers is secured.

Figure 3:
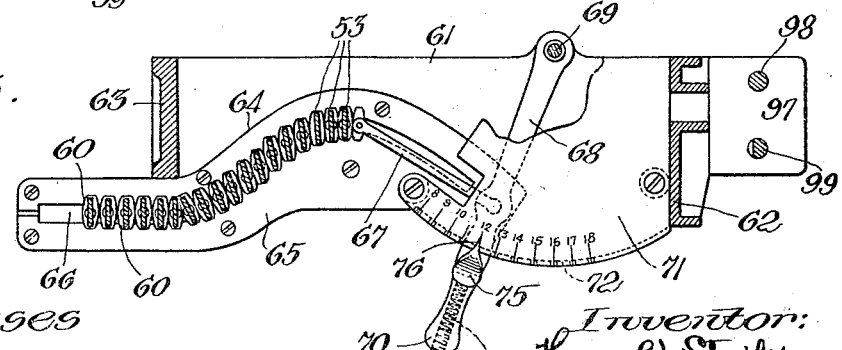

Referring to the accompanying drawings, Figure 1 illustrates in front elevation the operative portion of the machine embodying the invention. Fig. 2 illustrates a plan view of the same. Fig. 3 represents a section on the line 3—3 of Fig 1. Fig. 4 represents a section on the line 4—4 of Fig. 1. Fig. 5 represents a section on the line 5—5 of Fig. 2. Fig. 6 shows in detail a portion of the spacer-adjusting lever and the guides therefor. Fig. 7 illustrates a section on the line 7—7 of Fig. 2, looking in the direction of the arrow. Fig. 8 represents a partial plan view of the table with the bed or platen and the operating parts therefor removed. Fig. 9 illustrates an end elevation of the upper portion of the machine, the driving pulley being omitted. Fig. 10 shows in rear elevation the driving pulley and clutch mechanism. Fig. 11 illustrates an enlarged section on the line 11—11 of Fig. 2 and illustrates one of the marking devices and the elements with which it is connected. Fig. 12 illustrates a flexible connection between the bars to which the markers are attached. Fig. 13 illustrates one of the markers. Fig. 14 illustrates another form of marker and shows in section the bed or platen and a piece of the work. Figs. 15 and 16 are sectional views illustrating the operation of the bed or platen. Fig. 17 (Sheet 2) illustrates the end gage which is connected to the markers to move therewith. Fig. 18 represents a sectional view through the same. Figs. 19 and 20 are views of opposite sides of the end gage. Fig. 21 illustrates a combined gage and clamp for engaging the lower end of the fly. Fig. 22 represents a section on the line 22—22 of Fig. 21. Figs. 23 and 24 illustrate a clutch for operating the clamp. Figs. 25 and 26 (Sheet 6) illustrate two different forms of spacers which may be employed in the machine. Figs. 27 and 28 illustrate two flies with the locations of the buttonholes marked thereon and illustrating how the marks may be varied both as to number and relative position.

It will be understood that, while I have illustrated the best form of the invention now known to me and shall describe the same in detail, the invention is not limited to the particular embodiment of the invention which I have thus selected, that various changes may be made therein without departing from the spirit and scope of the invention, and that the phraseology which I employ is for the purpose of description and not of limitation. It will be further understood that the machine will be provided with any suitable frame-work for supporting it at the desired height so that the machine may be conveniently operated.

Proceeding now to the detailed description of the construction and mode of operation of the machine shown upon the drawings,—40 indicates a suitable support which may be supported by standards of any kind. 41, 42 indicate side frames or standards (see Fig. 1) between which is placed and to which is secured an upper table 43. The table is formed with a curved slot 44 which approximates the general curvature of the edge of the fly or the general curvature of the line of buttonholes, and which serves to define the curvature of the line of markers. In button shoes, irrespective of their style, there is what may be called a standard curvature of the edge of the buttonhole fly. These curvatures will vary in men's and women's shoes. The machine, as shown, is equipped for marking the buttonholes of women's shoes.

I propose to provide each machine with two interchangeable tables so that either may be secured in the machine and utilized for the particular class of shoes, i. e. men's or women's, which is to be made. The bed has raised front and rear marginal portions to form a recess for the reception of the guide-plates 45, 46, (Fig. 15) which form the top of the table and present a plane surface for the reception of the work, and thus serve as a work support. The confronting curved edges of these plates are rabbeted to form an undercut guideway above and communicating with the slot 44 for the reception of the markers. Each marker comprises a narrow metallic plate 47, as shown in Fig. 13, which is preferably provided with two prongs 48, 48. If desired, in lieu of the prongs, I may use two teeth 49 having cutting edges where it is desired to mark cloth instead of leather. Each plate is secured in a block or support 50 (see Figs. 11 and 17), consisting of an oblong block with curved end portions adapted to fit in the undercut guideway afforded by the table and the guide-plates 45, 46 thereon. Each block 50 has a slabbed cylindrical pin 51 (Fig. 17) fitting in the narrowest portion of the guideway and which is slit or grooved to receive the plate 47, said plate being held by a set-screw 52. The prongs of the markers project above the work-supporting surface of the table as shown in Fig. 5. Each block 50 is loosely connected with a bar or upright 53, (Fig. 11) which consists of an elongated flat metallic strip, the upper reduced end 54 of which is angular in section and extends loosely into a sleeve 55. The socket in the sleeve is angular in cross-section so as to fit the reduced end 54 of the upright, in consequence of which one is held against rotation relatively to the other. The upper end of the sleeve is connected by a gimbal or universal joint 56 to the block 50 from which it depends as shown in Fig. 11. The lower end 57 of each bar 53 is reduced and is formed with screw threads. The reduced ends of the bars are connected together by the links 58 (Fig. 12) of a flexible chain, said ends 57 forming the pintles for the said links. Each reduced end is also passed loosely through a guide-block 60, nuts 59 being employed to hold together the links of the flexible chain, the guide-blocks 60, and the uprights or marker bars 53.

From this description it will be seen that each marking device consists of a flat metallic upright bar 53, a slidable sleeve 55 at the upper end thereof, a block 50 sliding in the guideway and connected to the sleeve by a universal joint, so that the block will remain horizontal, and a pronged plate or marker 47 carried by the block. The lower ends of the marking devices are flexibly connected together, whereas the upper ends are disconnected from each other and hence may be moved close together or separated, as may be desired. It will be further seen that each marker is rotatably adjustable about the longitudinal axis of its marker bar so that the pronged plates may be arranged in any relative angularity as may be desired.

Immediately below the table 43 (Figs. 5 and 11) and in parallelism therewith, there is a lower or bottom table 61. This table, as shown in Fig. 1, is supported at its right-hand end by the lower portion 62 of the side frame or standard 42 depending from the upper table 43. Near its left-hand end, the lower portion 63 of the side portion or standard 41, depending from the table 43, is also secured to the lower table as shown in Figs. 1 and 3. Upon the lower table are secured guide-plates 64, 65, forming between them a curved track or guideway 66, the edges of the plates extending into grooves in the blocks 60, as shown in Figs. 3 and 11. Thus the marking devices are arranged in two vertically separated, horizontal guideways, longitudinally of which they are movable, said marking devices having upper and lower blocks 50 and 60 which are guided in their sinuous paths by the guide-plates afforded for that purpose. The lower ends of the marking devices may be all moved simultaneously in one direction or the other in the curved guideway 66, for the purpose of selecting for operation as many of the markers as may be desired. Ordinarily, in women's shoes, not less than eight buttonholes are employed, and, in the particular form of machine which I have shown, this number of markers is the lowest which may be utilized. For men's shoes, the machine may be adjusted for a smaller number of the markers. For moving the lower ends of the marking device, there is connected to the last right-hand link of the chain a connecting rod 67 which is pivotally connected to a lever 68 (see Fig. 3). This lever is fulcrumed upon a pin 69 and projects forwardly and horizontally in convenient position to be manipulated by the operator, being provided with a handle 70.

To the lower table 61 is secured a scale-plate 71 having a graduated scale thereon, as shown in Fig. 3, and having the numerals 8 to 18 inclusive to indicate the number of markers selected for use. A serrated curved strip or ratchet segment 72 is below the scale-plate and has notches to receive a movable locking dog 73 carried by the lever 68. A spring 74 normally holds the dog in its operative position in engagement with one of the notches. The dog extends through the lever and has a thumb-piece 75 and an index member. By moving the thumb-piece rearwardly, the dog may be disengaged from the serrated strip or ratchet and the lever moved from one side to the other. As the lever 68 is swung to the right or the left in Fig. 3, it moves into and out of operative position the marking bars at the left of the series. When the lever is at its limit of movement with its index opposite the numeral 8 on the scale, but eight of the markers are left in operative position, and, as the lever is moved to the right, the marking bars are brought successively into operative position, so that, when the index reaches the numeral 18, eighteen of the bars are brought into operative position. I do not mean by this description to indicate that the upper disconnected ends of the marking bars and the markers are necessarily moved into proper position by the operation of the chain and lever. This is accomplished by a separate instrumentality which I shall describe.

It should be noted that projecting laterally from the standard 41 (Fig. 8), there is an extension of the table which is provided with guide-plates 76, 77, which form a straight extension or continuation 81 of the curved guideway 44 in the upper table for the reception of the marker blocks 50. This extension 81, which corresponds to the straight portion of the guideway 66 in the lower table, serves to receive the upper ends of those markers which are in excess of the ones needed for marking the desired number of buttonhole locations in the fly. This guideway extension is normally covered by a curved cap or plate 79. In Fig. 8, it will be seen how the curved guideway 44 in the upper table merges into the guideway 81 between the two guide-plates 76, 77 of the extension. When the flexible chain and the lower ends of the marking devices are moved to the left by the actuation of the lever 68, the upper ends of the marker bars and the markers are concurrently moved by hand along the guideway until the surplus markers are located in the straight extension 81 of the guideway, leaving in the curved guideway 44 in the table the proper number of markers which may be utilized in marking the particular fly in which the buttonholes are to be formed. The lower ends of the marker bars are evenly spaced from each other by the links of the flexible chain, and each marker bar is freely rotatable about a longitudinal axis, as previously stated.

In order to secure the proper spacing of the upper ends of the marker bars and to secure their desired angular relation to the edges of the guideway and of the work upon which they are to operate, I employ interchangeable spacers or patterns. These spacers may be made in any suitable way. In Figs. 4, 25 and 26, I have shown three different forms thereof. Each spacer or pattern which is indicated at 84, the features of which will be subsequently described, consists of a plate of metal, hard fiber or other suitable material, insertible in a carrier 85 (Fig. 5). This spacer carrier (shown in Fig. 1) is placed between the upper and lower tables 43, 61, and extends transversely of the machine. At its left end, it is connected by a pivot 86 with the bracket 63 (see Fig. 4), and at its right end it has an extension 87 consisting of a pin or bar passing through a vertical slot 88 in the bracket 62. The pin or bar is passed loosely through a sleeve 89 (Fig. 6) which has trunnions 90 mounted in a lever 91, as shown in Figs. 1, 4, 5 and 6. The lever 91 is located below the table 43 and below the support 40 on which the table is mounted, and extends from the rear toward the front, being equipped with a handle 92 by which it may be manipulated. The rear end of the lever 91 is pivoted at 93 to a swinging link 94 which is pivoted at 95 to an ear or lug in the rear portion of the machine. Secured to flanges 96, 97, extending laterally from the side frame or standard 62, as shown in Figs. 1 and 4, are two parallel bars or rods 98, 99, between which the pin or bar 87 projects. The rod or bar 99 is serrated to constitute a rack which may be engaged by a dog or projection 100 on the lever 91. A spring 102, (Fig. 5) secured to the lever and bearing against the bracket 62, normally holds the dog in engagement with the serrated bar so as to maintain the spacer carrier in any position to which it may be swung about its pivot 86. By grasping the handle 92 of the lever and forcing it slightly to the left so as to disengage the dog or projection 100 from the serrated dog 99, the lever 91 may be swung upwardly or downwardly so as to move the spacer carrier from a horizontal position to a position at an angle to the horizontal either above or below a horizontal plane intersecting the pivot 86. The purpose of this will now be explained.

The spacer carrier is provided with a slot 103 extending through from the front to the rear for the reception of the spacers, and each spacer is provided at its ends with guides 104, 104, which will fit accurately in the slot, the outer edges of the guides being in parallelism as indicated. Between its ends, each spacer is provided with a plurality of fingers 105 forming between them a plurality of sockets or recesses 106, equal in number to the markers which are to be selected for operation and spaced thereby. The end walls of the recesses are arranged in a curved line approximating generally the curvature of the line of buttonholes to be formed or approximating generally the curvature of the guideway in the lower table. The spaces between these recesses govern the spaces between the markers and the relative angularity of the recesses controls the relative angularity of the markers as will be explained. Each recess is wide enough to receive and accurately hold a marker bar 53 against rotation. A spacer is inserted in the slot in the spacer carrier and the proper number of marker bars are engaged by the fingers 105 (Fig. 25) and located in the recesses between the fingers as shown in Fig. 4. When the spacer is thus inserted in the spacer carrier, the upper ends of the markers will be accurately located and spaced and will be arranged angularly, all according to the spacing and angularity of the recesses in the spacer bar, as will be readily understood. In the drawings, it will be noted, as previously stated, that there are eighteen markers. The lever 68, as shown in Fig. 3, has been adjusted to the left until the index 76 is opposite the numeral 12 on the scale-plate. As a consequence, the eighteen marking devices have been so adjusted that the lower ends of six of them are moved into an inoperative or inactive position, in the straight portion of the guide of the lower table, the upper portions of said marking devices being moved by hand into the corresponding portion of the guideway of the upper table. At the same time the remaining twelve marking devices have been positioned in the curved portions of the guideways, after which their bars are engaged by the spacer 84, as shown in Fig. 4, and their upper ends located and spaced in the positions predetermined by the spacing and positions of the recesses in the spacer bar. The upper ends of the six inactive markers have been moved into the extension 81 of the guideway 44 where they are covered by the cap 79. Now it will be seen that by swinging the spacer carrier from a horizontal position downwardly, the line of prongs on the markers will be elongated by reason of the separation of the upper ends of the marker without however varying the relative angularity of the marker-plates 47. On the other hand, by swinging the spacer carrier from a horizontal position upwardly, the line of markers will be contracted or shortened, the markers being brought closer together so as to reduce the space between them without affecting their relative angularity. Consequently, after a particular spacer has been selected for a certain style of shoe, by merely adjusting the spacer carrier to reduce or increase the spaces between the markers, the shoes of different sizes of that style will have the buttonholes accurately located thereon. Thus, by a single spacer or pattern-plate, I am able to mark the buttonholes on all shoes of the same style in all of the different sizes, provided all have the same number of buttonholes. If it should be desired to mark a greater or smaller number of buttonholes, additional markers may be moved into or out of active position as the case may be, and the spacer having the proper number of recesses will be used to locate them. It is not essential that all of the recesses in each spacer or pattern-plate should be occupied by markers, as for instance in Fig. 4, while I have shown a pattern-plate or spacer adapted for the reception of eighteen markers, yet, in point of fact, I have utilized the same plate for spacing but twelve of the markers. Of course if it be desired, each spacer or pattern-plate could be provided with only the number of fingers and intervening recesses needed for any particular number of markers. The machine will be provided with as many pattern-plates or spacers as may be needed for the various styles of button shoes which the manufacturer intends to produce.

I desire to call attention to the fact that, by employing spacers having varying distances between the recesses and adjusting the spacer carrier, any desired number of markers may be selected and properly positioned and spaced for a fly of any given length. For instance, in a fly, say nine inches long, any number of buttonholes from nine to eighteen all spaced as required can be properly marked. In other words, in a given length of the curved guideway in the upper table may be properly positioned and spaced any number of markers that the operator may desire to use.

After the desired number of markers have been selected for use and have been properly adjusted in the guideways afforded therefor, it is necessary that some means be provided for securing a relative movement of the markers and the work which they are intended to mark or indent. This is accomplished in the present machine by the employment of a movable platen or bed which is arranged above the upper table and which is normally withdrawn rearwardly far enough to permit the operator to place the work on the table above the markers. This platen or bed is indicated as a whole at 110. It consists of a bar having approximately the curvature of the guideway 44. The bar is preferably recessed, as shown in Fig. 15, the recess being filled with wood, felt or other suitable material as indicated at 111, to force the fly or work against the prongs or cutters of the markers. As shown in Fig. 15, a strip 112 of canvas is secured about the bed so as to cover a felt filling 111. The bed is clamped in the depending arms of a slide 113 (Figs. 2 and 5) by clamps 114 and screws 115. The slide is mounted in guideways 116 in an oscillating carrier 117. The carrier is provided with rearwardly extending arms, as shown in Fig. 5, which are pivoted on a stud shaft 118 mounted in ears or lugs 119 rising from a cross-bar 120 arranged between the side standards 41, 42. By oscillating the carrier 117 about the shaft 118 and by moving the slide backward and forward, the bed or platen may be caused to move forwardly and then downwardly to press the work upon the markers, then upwardly and rearwardly. Any suitable means may be utilized for causing these movements. For example, I may employ a mechanism comprising a shaft 121 journaled in bearings in the standards 41, 42. Upon this shaft is mounted a cam 122 which operates a lever 123 (Fig. 5) journaled on the shaft 118 and having an arm 124 connected by a link 125 with the rear end of the slide 113. The lever 123 has a roll 126 bearing against the cam 122, said roll being retained in engagement with the cam by divergent springs 127 (see Figs. 1 and 5). The cam 122 is substantially heart-shaped, so that, during one complete rotation thereof, the slide will be advanced forwardly rapidly and then remain quiescent (so far as backward and forward movements are concerned) until the cam has completed its rotation, whereupon it will be drawn backward rapidly. Upon the shaft 121 are also mounted two cams 128 which are arranged in slots 129 in the carrier 117. As these cams rotate, they rock the carrier 117 about its pivot so as to lower and raise the platen which is mounted in the forward end of the slide. From this description, it will be seen that, during one complete rotation of the shaft 121, the platen will be first advanced, then lowered, then raised and then withdrawn into inactive position. Normally the platen occupies the position shown in Figs. 2 and 15, where it is withdrawn so as to uncover the markers and permit the operator to insert the work thereover.

Any suitable clutch mechanism may be utilized for causing power to be imparted to the cam shaft 121 to cause it to make one complete rotation and then stop. There are a variety of different mechanisms which are well-known and which may be used for this purpose. I have illustrated, however, a mechanism which is suitable for the purpose and which I will now describe. It comprises a power shaft 130 having thereon a loosely running belt wheel 131 to which power is transmitted by a belt from any suitable nearby driving shaft. Fast on the shaft 130 is a small gear 132 meshing with a larger gear 133 on the cam shaft. As shown in Fig. 10, the pulley 131 has a clutch pin 134, and on the shaft 130 there is a disk 134' which carries a clutch segment 135 pivoted thereto at 136. A spring 137 tends to throw the clutch segment outwardly so that a stop or shoulder 138 thereon will engage the clutch pin 134 so that the pulley in its rotation will cause the rotation of the disk and the shaft 130.

In order that the clutch segment may be disengaged from the clutch pin when one rotation of the shaft 121 has been completed, I employ the following mechanism. A lever 139 (Fig. 9) is pivoted at 140 to the side standard 41, and its rear end is connected by a link 141 or other suitable connection with a foot-treadle (not shown) by means of which it may be depressed against the tension of the spring 142 which normally holds it upwardly. This lever is provided with a stop-plate 143 (Figs. 9 and 10) having a cam edge which may engage the clutch segment as the latter rotates and disengage it from the clutch pin 134. When the machine is at rest, the operator, by depressing the treadle (not shown) and drawing downwardly on the connection 141, will swing the lever 139 downwardly so as to disengage the stop-plate 143 from the clutch segment 135 so that the latter will immediately be propelled outwardly by its spring 137 until its stop or shoulder 138 is in the path of the clutch pin 134. Thereafter the pulley will cause the rotation of the shaft 130. As the shaft 130 begins to rotate, it also causes the rotation of the shaft 121 through the gears 132, 133. On the shaft 121 there is a cam 144 which engages a shoulder or projection 145 on the lever 139 and holds the lever downwardly until the cam 144 makes one complete rotation. As soon as the shoulder 145 rides off from the cam 144, the lever 139 is forced upwardly by its spring so as to move the plate 143 into the path of the clutch segment 135. The stop-plate is cam-shaped, so that, as the shoulder or stop 138 comes in contact therewith, it rides along the inner face of the plate and is forced backwardly far enough to disengage it from the pin 134, whereupon the rotation of the shaft 130 ceases. Adjacent the plate 143 there is a brake 146 which engages the periphery of the disk 1341 and of the clutch segment 135 to effect the cessation of rotation of the shaft 130 gradually and yet quickly.

In order that the work may be properly located upon the table with respect to the markers, I employ three separate gages, one for the curved edge of the fly and one for each end of the fly. These gages are all adjustable. Referring to Fig. 8, I have illustrated what I may term the "edge gage." It consists of a metallic strip 150 of either resilient or ductile material arranged upon the table so as to project upwardly therefrom. Extending rearwardly from the base of the strip are three slotted feet 151 through which fastening screws 152 are passed into the table. This gage is arranged in the rear of the markers and its curvature approximates the standard curvature of the edge of the buttonhole fly. The gage for what subsequently becomes the upper end of the fly, and which I shall refer to as the upper end gage, is indicated at 153. This is shown in Figs. 8, and 17 to 20 inclusive. It is connected with the first marker of the series, as will be explained. The gage consists of a metallic plate which extends across the guideway for the markers and which has a straight edge 154 against which the upper end of the buttonhole fly may be placed. It is pivoted upon a stud 155, which stud extends upwardly from a slide 156, the slide itself being mounted upon a carrier block 157 adapted to slide in the guideway 44. The slide 156 is mounted in a guideway in the block and is held in any desired position by a set-screw 158. The block has an eye 159 pivoted thereto by a pintle 160, the eye being normally engaged with a pin 161 on the first marker carrier or block 50. The eye is held in position by a spring 162, so that, by depressing the eye, the gage block 157 may be disengaged from the marker-block or carrier. The gage 153 is rotatably adjustable about the stud 155, which is in line with the markers, so that its straight edge may be set at that angle to the guideway 44 which corresponds to the angle formed by the upper end of the fly to its curved edge. For convenience, the gage is formed with a graduated segment 164 having notches 1641 to receive a spring-pressed index 1642 placed in the slide 156.

The gage for what eventually becomes the lower end of the fly, and which for convenience I shall call the lower end gage, also serves the purpose of a clamp for the fly. This is shown in Figs. 7, 8, 21 and 22 to which reference may now be had. This gage consists of a plate 165 which adjacent its rear end is secured to a rock-shaft 166 which is journaled in the table. Secured to the rock-shaft 166 is a lever 167 having a handle 168 by which the gage may be rocked about the axis of the shaft 166 horizontally. The gage is provided with an upstanding lip 169 and with an overhanging flange 170, as shown in Fig. 22. Against this lip may be placed the lower end of the fly as shown in dotted lines in Fig. 21 and in full lines in Fig. 22. The gage-plate 165 is also provided with two upstanding pins 176 against which the edge of the fly adjacent its lower end may be placed to assist the edge gage 150 in locating the edge of the fly with respect to the markers. The gage may be held in any desired adjustment longitudinally of the guideway for the markers by means of an abutment screw 171 (Fig. 2) against which the lever 167 is held, as shown in Fig. 21, by a spring 172, one end of which is connected to the lever 167 and the other end to a stud on the frame, see Figs. 1 and 9. The clamp, of which the gage-plate 165 forms one member, also includes the movable member 173 which is pivoted thereto as shown in Fig.

21 by the pintle 174. The clamp member 173 is held normally raised by a spring 175, as shown in the last-mentioned figure. Its movement away from the plate 165 is limited by the overhanging flange 170 which lies above the end of the clamp member 173. Said clamp member 173 has apertures to receive the gage pins 176.

I preferably employ mechanism controlled by the power shaft for automatically opening the clamp. Any suitable mechanism for accomplishing this purpose may be utilized. For example, I may employ a lever 180 (see Figs. 7 and 8) fulcrumed upon a screw-pivot 181. In the forward end of this lever is secured a pivoted extension 182 which projects over the clamp member 173. The extension or finger 182 is held friction-tight upon the lever 180, but it may be adjusted about its pivot so as to engage the clamp member in whatever position the latter may be adjusted about the axis of the shaft 166. To the rear end of the lever 180 is secured an extension 184 by means of a pivot whose axis is transverse to the axis of the pivot 181. The extension 184 projects rearwardly and then upwardly, and on its upper end is provided with a handle 185, as shown in Fig. 7. The extension 184 also has an arm 186 to which a spring 187 is secured. This spring is strong enough to rock the lever 180 about its axis and close the clamp against the tension of the spring 175. The parts 180, 182 and 184 may all be considered as a single lever, although the lever is formed in the three parts for the purposes to be further explained. This lever is automatically operated to permit the spring 187 to close the clamp when the operator has depressed the treadle to cause the actuation of the platen or bed. To this end, there is mounted loosely upon the cam shaft 121 a peripherally grooved cam 190. In its end face, said cam has a socket or recess 191 to receive a pin 192 projecting radially from the cam shaft, as shown in Figs. 23 and 24, so that, when the shaft is in rotation, the cam 190 may be rotated with it. The extension 184 of the clamp-operating lever lies in the groove in the periphery of the cam, so that, when the cam shaft rotates, the cam will permit the spring 187 to draw the rear end of the cam-operating lever upwardly, whereupon its front end will be depressed to close the clamp on the end of the fly. The cam is so formed and the machine may be so timed that, when the cam shaft is at rest, the cam 190 will hold the rear end of the cam-operating lever downwardly to permit the clamp to open. As soon as the cam shaft starts to operate, however, the cam 190 releases the lever and its spring 187 causes the lever to close the clamp at once and engage the fly.

I prefer, however, an arrangement by which the operator may cause the closing of the clamp before starting the operation of the machine. For this purpose, the cam 190 is movable axially of the shaft 121. Between the cam and the side standard 41 is placed a lever in the form of a ring as indicated at 195. A screw or other fastening 196 serves as the fulcrum for this lever. This ring-like lever has offsets 197 which bear against the face of the cam hub; and a spring 198 encircling the cam shaft bears against the cam so as to hold it normally in position so that the pin 192 will be engaged in the recess 191 in the face of the cam, as shown in Figs. 23 and 24. By moving the lever 195 to the left, the cam may be moved along from the shaft far enough to be disengaged from the pin 192. Now the pin is so located with respect to the shaft and the machine is so timed, that, when the cam shaft comes to a state of rest, the cam will occupy the position shown in Fig. 7. Consequently, if the cam be disengaged from the clutch pin 192, the pressure of the cam-operating lever against the cam under the tension of the spring 187 will be sufficient to partially rotate the cam about the shaft far enough to permit the cam-operating lever to close the clamp. The cam is moved longitudinally of the shaft by a manually-operated lever 200, as shown in Fig. 8. This lever is located at the front of the machine immediately above the upper table and in front of the guideway for the markers. It is secured to a rock-shaft 201 which extends rearwardly and which has on its rear end an eccentric or cam 202 extending through an aperture in the standard 41 into engagement with the forward end of the ring-like lever 195. By depressing the lever 200 and rocking the shaft 201, the ring-like lever 195 will be thrust to the right, carrying with it the cam 190 against the tension of the spring 198 and unclutching said cam from the cam shaft. Thereupon the clamp will close upon the work. Then the operator, by depressing the treadle (not shown), will clutch the driving pulley to the shaft and cause the operation of the machine. When the cam shaft 121 has made a partial rotation, the clutch pin 192 will register with the recess 191 in the cam and the spring 198 will thereupon move the cam to the left to cause it to be again clutched to the cam shaft 121. Thereafter, as the cam shaft continues to rotate, it also rotates the cam 190, and, as the latter is about to complete its rotation, it thrusts downwardly the extension 184 of the cam-operating lever and releases the clamp so that the latter may open and permit the operator to remove the marked fly. It is because of this sliding axial movement of the cam that I have pivoted the extension 184 to the lever 180 in order that the lever may move sidewise with the cam. This is a mere detail of construction, however, and the same result could be accomplished by the substitution of equivalent mechanism. I prefer to provide the clamp-operating lever with a handle, because, if it should happen that the work should be improperly clamped, it is possible, by moving the handle 185 rearwardly to permit the clamp to open in order that the work may be readjusted.

It will be observed, by an inspection of Figs. 8 and 21, that the lower end gage and clamp extend across the guideway for the markers. When in this position, it serves as a gate to prevent the surplus markers in the extension of the guideway from being accidentally forced into position in the curved portion of the guideway where they would engage the work and damage the flies. When it is desired to locate additional markers in operative position in the main portion of the guideway, or to eliminate a portion of those already in position, the lower end gage may be swung bodily about its axis to the dotted position in Fig. 21, so as to move it out of the path of the markers and permit them to be moved along the guideway.

Inasmuch as the markers are provided with prongs or cutters which project upwardly from the surface of the table, as shown in Fig. 5, or in Figs. 15 and 16, and which might scratch or damage the flies or shoe uppers or might cause some injury to the operator, I employ a yielding work-receiving and protector plate 210, as shown in Figs. 2 and 5. This plate consists of a thin sheet of flexible material, such as thin sheet steel or brass, and it is located above the front portion of the upper table. Its front edge is bent downwardly, as shown in Fig. 5, and is secured to the front of the table by clips 211, as shown in Fig. 1. The conformation of the rear edge of the plate is like that of the front edge of the guideway for the markers; and the plate is held normally raised above the table by one or more springs 212. The plate is thus normally elevated above the upper ends of the points or prongs on the markers, so that, when the work is being inserted beneath the platen or into engagement with the gages, it will not come in contact with the points or prongs. In Fig. 15, I have shown a fly $a$ as having been placed in position above the markers with its curved edge engaging the edge gage 150. When the platen or bed is actuated, it moves forwardly and downwardly, and, as the platen engages the fly and forces it downwardly into engagement with the prongs, the plate 210 will be depressed as shown in Fig. 16.

The operation of the machine will be readily understood from the foregoing description. The proper number of buttonhole markers having been selected and having been accurately located by a suitable spacer or pattern, the operator inserts a fly or the shoe upper in the space below the bed or platen until its curved edge engages the edge gage 150 and its ends are properly located by the end gages. The operator then depresses the lever 200 (Fig. 8), whereupon the clamp will be closed as previously explained. The operator then depresses the treadle to cause the clutching of the driving pulley to the main shaft and the machine is thereupon set in motion,—the platen moving forwardly over the work and then downwardly to cause the work to be indented or punctured by the prongs or cutting edges of the markers, as shown in Figs. 27 or 28. The platen then moves upwardly and rearwardly, and, as it reaches the rearward extreme of its movement, the pulley is automatically unclutched from the driving shaft, and the driving shaft and cam shaft come to a state of rest. It is my intention that the power shaft should rotate at a speed of say 250 to 300 revolutions per minute, and, even though the ratio of the gears between the power shaft and the cam is 4 to 1, it will be seen that the platen is actuated with rapidity. As the result, it is possible to mark a great many pairs of flies or shoe uppers per day,—approximately four thousand pairs. Of course this output will depend somewhat upon the skill and speed of the operator.

So far as I am aware, I am the first to have provided a machine with a plurality of markers movable along a sinuous guideway provided with an extension and to have provided for the selection of any predetermined number thereof for operation in the main body portion of the guideway and the location of the remainder in the extension, in order that a single machine may be utilized for marking any number of buttonholes upon a fly; and, so far as I am aware, I am the first to have provided any means for varying the angularity of the marks with respect to the edge of the buttonhole fly, or to have provided for grouping the buttonholes or spacing them irregularly if desired.

According to this invention, after a predetermined number of markers have been spaced and positioned as to angularity, the adjustment of the spacer varies the spacing of the markers without varying their relative angularity. This variation in the spacing, after the markers have been once positioned, is accomplished by contracting or expanding the marking devices fanwise; that is, their lower ends are held against movement while their upper ends are moved toward and from each other to lengthen or shorten the line of markers.

I have herein used the expressions inner and outer, upper and lower, etc. These are merely relative expressions and are not used for the purpose of limitation.

As I have stated in the beginning of this specification, it will be quite apparent to those skilled in the art that the invention, which I have thus broadly disclosed herein, is capable of a variety of embodiments. Many of the details of construction, which I have herein described for the purpose of making the operation of the machine clear to the reader, may be changed to suit the convenience of the machine designer or user.

It will be unnecessary to describe the advantages resulting from the construction and arrangement of parts which I have herein described. There are several minor features, however, to which I may call attention. For instance, it will be noted by an inspection of Fig. 5 that the edge gage 150, whose curvature is approximately that of a fly or of the edge of the upper, is of sufficient height that, when the bed or platen is in its inactive position, they are so close together as practically to prevent any of the work passing between them. Consequently the operator may merely insert the work beneath the bed or platen, and thrust it rearwardly far enough so that its edge engages to and conforms with the curvature of the edge gage without danger of the work slipping past the edge gage. Another point, to which I may advert, is that the upper end gage 153 extends across and rests upon the yielding plate 210 so that it rises and falls therewith. This is permitted since the block 157, which supports it, is free to rise and fall in the curved guideway, having no parts which project into the undercut portions thereof.

While the clamp for engaging the lower end of the fly or upper, under normal conditions, is closed by the operator and the machine thereafter is set in motion, the result of which is that the clamp is automatically opened when the machine completes its operation,—it is sometimes desirable to close the clamp upon the work so that the work may be held in place while the markers are being adjusted. The work may be released in such case when the adjustment has been completed by opening the clamp through the manual operation of the handle 185 (Figs. 1 and 7).

Having thus explained the nature of my said invention and described a way of making and using the same, although without attempting to set forth all of the forms in which it may be made or all of the modes of its use, what I claim is:

1. A buttonhole marking machine comprising a fly supporting table, provided with a curved guideway approximating the standard curvature of a button fly, and a plurality of markers all movable longitudinally of said guideway in the same direction, said table having means located beyond one end of said guideway to form an extension of the guideway to carry a selected portion of said markers into inactive position, the remaining portion of the markers being retained in an active position within the main portion of the guideway.

2. A buttonhole marking machine comprising a fly supporting table, provided with a curved guideway approximating the standard curvature of a button fly, and a plurality of markers all movable longitudinally of said guideway in the same direction, said table having a lateral extension provided with means located beyond one end of said guideway to form an extension of the guideway to carry a selected portion of said markers into inactive position, the remaining portion of the markers being retained in an active position within the main portion of the guideway, and means for relatively spacing the markers retained in active position in the main guideway.

3. A button hole marking machine comprising a fly supporting table, provided with a curved guideway approximating the standard curvature of a button fly, and a plurality of markers all movable longitudinally of said guideway in the same direction, said table having means located beyond one end of said guideway to form an extension of the guideway to carry a selected portion of said markers into inactive position, the remaining portion of the markers being retained in an active position within the main portion of the guideway, means for holding the active markers in spaced relation, and means for varying the relative spacing of the markers retained in active position, without affecting those in inactive position.

4. A buttonhole marking machine comprising a fly supporting table, provided with a curved guideway approximating the standard curvature of a button fly, and a plurality of markers all movable longitudinally of said guideway in the same direction, said table having means located beyond one end of said guideway to form an extension of the guideway to carry a selected portion of said markers into inactive position, the remaining portion of the markers being retained in an active position within the main portion of the guideway, and a cover for the guideway extension to prevent accidental exposure of the inactive markers.

5. A button hole marking machine comprising a fly supporting table having a curved guideway, a plurality of marking devices provided with markers movable longitudinally along said guideway in the same direction, said guideway being provided with an extension to carry a selected portion of said markers into inactive position, a spacer having means for engaging the marking devices carrying the markers remaining in active position without affecting those in inactive position, and means for bringing the marking devices carrying the active markers and the work into engagement.

6. A buttonhole marking machine comprising a fly supporting table having a curved guideway, a plurality of markers movable longitudinally along said guideway in the same direction, said guideway being provided with an extension to carry a selected portion of said markers into inactive position, a spacer having means for engaging the markers remaining in active position without affecting those in inactive position, means for bringing the active markers and the work into engagement, and means for moving said spacer to vary the relative spacing of the active markers.

7. In a machine for marking buttonholes, a movable platen, a fly supporting table having a guideway longitudinal of the platen and of which a portion extends beyond the end of the platen, a plurality of markers in and movable longitudinally of the guideway, and means whereby said markers may be moved longitudinally of the guideway to selectively place all or a portion of them into working position with reference to the platen.

8. In a machine for marking buttonholes, a plurality of marking devices, means for flexibly connecting the lower ends of the marking devices together in permanent spaced relation, the upper ends being free, and a spreader for spreading or bringing together the marker elements fanwise to vary the relation to one another of the upper ends.

9. In a machine for marking buttonholes, a plane table having a guideway, a plurality of extensible marking devices, having operative end portions movable horizontally in said guideway, means connecting the other end portions of the marking devices in permanent spaced relation, and means for expanding or bringing together said marking devices fanwise to vary the relation to one another of the upper ends.

10. A buttonhole marking machine comprising a fly supporting table, provided with a curved guideway approximating the standard curvature of a button fly, and a plurality of markers all movable longitudinally of said guideway, said guideway having an extension to carry a selected portion of said markers into inactive position, the remaining portion of the markers being retained in an active position within the main portion of the guideway, and a platen having an operative portion coextensive with the main portion only of said guideway.

11. A buttonhole marking machine comprising a fly supporting table, provided with a curved guideway approximating the standard curvature of a button fly, and a plurality of marking devices provided with markers all movable longitudinally of said guideway, said guideway having an extension to carry a selected portion of said markers into inactive position, the remaining portion of the markers being retained in an active position within the main portion of the guideway, a platen having an operative portion coextensive with the main portion only of said guideway, and means for moving said marking devices simultaneously in the same direction to permit adjustment of the markers toward either end of the guideway to selectively position them, including means whereby the extent of movement necessary to obtain a desired selection of markers may be predetermined.

12. In a machine for marking buttonholes, a flat fly support, a plurality of marking devices, and means for removably engaging all or a selected portion of the marking devices to space and fix the engaged marking devices against displacement and in position to mark buttonhole locations in a fly.

13. In a machine for marking buttonholes, a flat fly support provided with a guideway, a plurality of markers all movable longitudinally of said guideway in the same direction, and means for selectively spacing all or a portion of said markers within a predetermined portion of said guide.

14. In a machine for marking buttonholes, a plurality of marker bars provided with markers, means for imparting simultaneous movement to all of said marker bars to permit the selective placing of the markers in operative position, and means for spacing the marker bars carrying the selected markers toward or from each other and holding them in fixed relation to mark buttonhole locations in a fly.

15. In a machine for marking buttonholes, a continuous guideway, an end gage for the button fly, a plurality of marker bars provided with markers, all of said bars being bodily movable longitudinally of said guideway and relatively to said gage, and means for imparting bodily movement to all of said bars simultaneously toward or from said gage to permit of the selective bringing of any predetermined number of markers into an operative position in said guideway in spaced relation to said gage.

16. In a machine for marking buttonholes, a bed or platen, and a plurality of marker bars provided with markers between which, and the platen the work may be placed, means for effecting a relative movement of said bed or platen and said markers, and means by which any predetermined number of said marker bars may be spaced and fixed to locate the markers carried thereby in potential operative position with relation to said bed or platen, and the remainder moved laterally and located in an inoperative position with relation to said platen.

17. In a machine for marking buttonholes, a bed or platen, and a plurality of marker bars provided with markers between which and the platen the work may be placed, means for effecting a relative movement of said bed or platen and said markers, and a guideway for said markers, said markers being bodily movable along said guideway, means for moving all of said marker bars simultaneously in the same direction, whereby the markers may be moved toward either end of the guideway, and means for limiting said movement to selectively place the whole or any predetermined number less than the whole of said markers in operative relation to said bed or platen.

18. In a machine for marking buttonholes, a platen, a plurality of markers coöperating with the platen, means for effecting a relative movement of said platen and said markers, a continuous guideway along which all of said markers are movable, means by which said movement is effected to permit any predetermined number of markers to be selected, and means for variably spacing the selected markers in said guideway in operative relation to the platen.

19. In a machine for marking buttonholes, a guideway, a plurality of markers movable therein, said guideway having an extension at one end to form an extension to carry a selected portion of the markers into inactive position, and means for relatively spacing the markers retained in the main portion of said guideway, the remaining markers being retained within said extension.

20. In a machine for marking buttonholes, a fly support, a guideway having an extension beyond said fly support, a plurality of marker bars provided with markers movable in said guideway, and means for moving said marker bars to place a selected portion of said bars in position to permit the markers attached thereto to be placed in inactive position within said extension.

21. In a machine for marking buttonholes, a bed or platen, a guideway longitudinal thereof, a plurality of markers, means by which a selectively variable number of said markers may be moved to a predetermined operative position in the bed and the remainder be moved longitudinally of the guideway to an inactive or inoperative position beyond the bed or platen, and means for relatively spacing the selected markers.

22. In a machine for marking buttonholes, a bed or platen, a table having a guideway, a plurality of marker bars carrying markers movable longitudinally of the guideway, means for moving all of said marker bars to permit movement of the markers in said guideway to selectively place a variable number of the markers in potential working relation to said bed or platen, the remaining markers being moved to inoperative position, and means for varying the spacing of the selected markers.

23. In a machine for marking buttonholes, a plurality of markers, a spacer for positioning and spacing a predetermined number of said markers to mark a predetermined number of buttonholes in the work, and a carrier for removably supporting said spacer.

24. In a machine for marking buttonholes, a plurality of marking devices, a spacer for positioning and spacing a predetermined number of said devices to mark a predetermined number of buttonholes in the work, a carrier for said spacer, and means for adjusting the angle of the carrier with respect to the marking devices to vary the relative distances between said marking devices.

25. In a machine for marking buttonholes, a plurality of marking devices, means for permanently connecting said marking devices at one end thereof to prevent relative separation leaving the other ends free to be adjusted toward and from each other, and a spacer provided with means for spacing the free ends of a variable number of said marking devices.

26. In a machine for marking buttonholes, a plurality of longitudinally extensible marking devices, a guideway for the operative portions thereof, means for permanently connecting the other portions of said marking devices, and means for adjusting said marking devices with respect to said guideway and simultaneously varying the length of the marking devices.

27. In a machine for marking buttonholes, a series of marking devices, means for connecting said marking devices at one end, a sinuous guideway for the other end of the marking devices, and means attached to the connected ends of said marking devices for bodily moving them simultaneously in the same direction longitudinally of the series and of said guide.

28. In a machine for marking buttonholes, a series of marking devices, a fly support having a guideway longitudinal of the series for guiding the operative ends of the marking devices, and means conforming to the guideway for connecting the opposite ends of the marking devices, said connecting means being movable parallel with said guideway.

29. In a machine for marking button holes, a series of marking devices, means for guiding the operative ends thereof, articulated means for connecting the opposite ends of the marking devices, means whereby said articulated means is made to conform to said guiding means, the operating ends of said marking devices being free for relative adjustment, and a spacer for spacing said operative ends.

30. In a machine for marking button holes, a series of marking devices, means for guiding the operative ends thereof, means for connecting the opposite ends of the marking devices, a detachable spacer for spacing the operative ends of said markers, a spacer holder, and means for changing the angle of said spacer holder and spacer with respect to the marking devices to open or contract said series of marking devices fan-wise to adjust the operative ends of said marking devices.

31. In a machine for marking buttonholes, separated guideways arranged in parallel planes, a plurality of longitudinally extensible marking devices each movable along both of said guideways longitudinally of the latter, and means for changing the relative angles of said marking devices to separate or draw together the operative portions thereof.

32. In a machine for marking buttonholes, a plane table having a guideway, a plurality of marking devices each comprising a work marking member movable in said guideway, and a bar slidingly connected therewith at one end, whereby each marking device is extensible, articulated means for connecting the other ends of the bars, a spacer engaging said bars between said members and said connecting means for spacing said members, and means for moving said spacer to relatively expand or draw together the said marking devices fanwise.

33. In a machine for marking buttonholes, a plurality of marking devices provided with markers each marking device being angularly adjustable about its longitudinal axis, and a spacer engaging said marking devices to retain them in spaced relation and having means for effecting rotative adjustment of said markers to vary their relative angularity.

34. In a machine for marking buttonholes, a curved edge gage for the edge of the work, a plurality of markers, and means for positioning said markers simultaneously at varying angles to said edge gage.

35. In a machine for marking buttonholes, a curved edge gage for the edge of the work, a plurality of markers each rotatively adjustable independently of the other, and each having means for marking the location and angle of a buttonhole, and means for simultaneously positioning and holding said markers at various angles to said edge gage.

36. In a machine for marking buttonholes, an edge gage for the edge of the work, a table having a continuous guideway, a series of marking members in said guideway each having means for marking a fly to indicate the location and angle of the buttonhole with respect to the edge of the work, a spacer for simultaneously securing angular adjustment of said marking members relative to each other and to said guideway, and means for adjusting said spacer to vary the spacing of said members longitudinally of said guideway without varying their relative angularity.

37. In a machine for marking buttonholes, a guideway, a plurality of markers movable in said guideway, and each having means for marking a fly to indicate the location and angle of a buttonhole in the work, and means for positioning said markers both as to spacing and relative angularity.

38. In a machine for marking buttonholes, a series of markers, each having means for marking the location and angle of a buttonhole in the work, means for supporting said markers, means for positioning any predetermined number of said markers both as to relative spacing and relative angularity.

39. In a machine for marking buttonholes, a series of markers, each having means for marking the location and angle of a buttonhole in the work, means for positioning a predetermined number of said markers both as to spacing and relative angularity, and means by which the said positioning means varies the relative spacing of such predetermined number of markers, after being positioned, without varying their relative angularity.

40. In a machine for marking buttonholes, a sinuous guideway, a plurality of markers each having means for marking the location and relative angle of a buttonhole, and means for spacing the markers in said guideway and for angularly adjusting said markers relatively to said guideway to determine the angularity of the buttonholes relatively to the edge of the fly.

41. In a machine for marking buttonholes, a plurality of markers each having means for marking the location and angle of a buttonhole in the work, and means by which a selected portion of said markers may be simultaneously spaced and angularly adjusted to mark the locations and the angles of a variable number of buttonholes with reference to the edge of the fly.

42. In a machine for marking buttonholes, a plurality of buttonhole marking devices, and a detachable spacer movable transversely of the marking devices to be brought into and out of engagement therewith, said spacer having alternating fingers and recesses for receiving and spacing said marking devices.

43. In a machine for marking buttonholes, a plurality of buttonhole marking devices, a carrier, and a spacer detachably supported by said carrier, said spacer being movable transversely of the marking devices to be brought into and out of engagement therewith, said spacer having spaced recesses to simultaneously space and angularly position said markers, with respect to each other to indicate the angularity of the buttonhole.

44. In a machine for marking buttonholes, a plurality of buttonhole marking devices, a carrier, a spacer detachably supported by said carrier and having recesses open at one end to receive and space said marking devices, and means for moving one end of the carrier to cause the spacer to vary the spacing of the marking devices, said carrier having provision for detachably receiving said spacer.

45. In a machine for marking buttonholes, a plane table having a guideway, a plurality of longitudinally extensible marking devices having markers movable in said guideway, and having bars whose ends are remote from said guideway, means for pivotally connecting said bars together at one end, and a spacer located between said pivotal connecting means and said guideway for spacing said markers, and simultaneously varying the length of said marking devices.

46. In a machine for marking buttonholes, a table having a guideway, a plurality of marking devices having markers movable in said guideway, and having bars whose ends are remote from said guideway, means for pivotally supporting the said ends of said bars in predetermined relation, a spacer between the pivotal supporting means and said table and normally parallel with the table, and having recesses for receiving and positioning said bars, and a carrier for said spacer, pivotally supported adjacent the end of the spacer for angularly adjusting the spacer with respect to the table and thereby varying the spacing of said markers.

47. In a buttonhole marking machine, a pair of separated upper and lower guideways, a plurality of marking devices movable in said guideways, a flexible connection adjacent the lower guideway for connecting the lower ends of the marking devices, means for moving said flexible connection longitudinally of its adjacent guideway, and means for spacing the upper ends of a selected number of the markers.

48. In a buttonhole marking machine, a pair of separated upper and lower guideways, a plurality of marking devices movable in said guideways, a flexible connection adjacent the lower guideway for connecting the lower ends of the marking devices, and means for moving said flexible connection longitudinally of its adjacent guideway to selectively locate varying numbers of said markers for operation.

49. In a buttonhole marking machine, a pair of separated upper and lower guideways, a plurality of marking devices movable in said guideways, a flexible connection adjacent the lower guideway for connecting the lower ends of the marking devices, means for moving said flexible connection longitudinally of its adjacent guideway, and means whereby the extent of movement of said connection may be predetermined.

50. In a machine for marking buttonholes, parallel upper and lower guideways, a plurality of marking devices each having blocks movable in said guideways, means for pivotally connecting the blocks in the lower guideway, means for moving the said connected blocks longitudinally in their guideway, and means whereby the extent of movement of said blocks may be predetermined to select a desired number of markers for operation.

51. In a machine for marking buttonholes, parallel upper and lower guideways, a plurality of marking devices each having blocks movable in said guideways, means for pivotally connecting the blocks in the lower guideway, means for moving the said connected blocks longitudinally in their guideway, means whereby the extent of movement of said blocks may be predetermined to select a desired number of markers for operation, a spacer for engaging the selected marking devices between the blocks for positioning the blocks in the upper guideway, a carrier for said spacer, and means for moving said carrier to cause said spacer to adjust said markers fan-wise to vary the spaces between the same.

52. In a machine for marking buttonholes, a series of markers each comprising a plate having separated indenting points for locating the position and angularity of the button holes in the work, and means for holding said plates in a desired position and angle.

53. In a machine for marking buttonholes, the combination with an upper table having a guideway, a lower table having a guideway, a chain in said lower guideway, of a plurality of marking devices arranged in said guideways and pivoted to said chain, a spacer supported between said guideways and engaging said marking devices, each of said marking devices being provided with blocks sliding in the respective guideways, a bar connecting said blocks, and a universal joint connecting each of said bars and one of its corresponding blocks.

54. In a machine for marking buttonholes, the combination with an upper table having a guideway, and a lower table having a guideway, and a chain in said lower guideway, of a plurality of marking devices arranged in said guideways, a spacer supported between said guideways and engaging said marking devices, each of said marking devices being provided with blocks sliding in the respective guideways, and a bar connecting said blocks, and a universal joint connecting each said bar and one of its corresponding blocks, each bar having a slidable engagement with one of its corresponding blocks.

55. In a machine for marking buttonholes, a table, a guideway, a series of marking devices, end gages for the work located adjacent the end marking devices of the series, and extending across the guideway, and means for moving all of said marking devices simultaneously in the same direction, longitudinally of the guideway and relatively to one of the gages.

56. In a machine for marking buttonholes, a table, a guideway, a series of marking devices, means whereby all of said marking devices may be moved simultaneously in the same direction, longitudinally of the guideway, an end gage attached to and movable with the end marker of the series, and means for varying the angle of said gage with relation to the guideway.

57. In a machine for marking buttonholes, a work table having a guideway, a series of marking devices in said guideway adjustable longitudinally thereof, an end gage connected with the end marking device of the series and adjustable therewith longitudinally of the guideway, and means for adjusting said gage to lie at different angles to the guideway.

58. In a machine for marking buttonholes, a work table having a guideway, a series of adjustable marking devices in said guideway, and a top end gage in said guideway and adjustable longitudinally therein, said gage having a straight edge for engaging the top end of the fly.

59. In a machine for marking buttonholes, a work table having a guideway, a series of adjustable marking devices in said guideway, an end gage connected to one of the markers and movable within the guideway, and means by which said gage is adjustable to be at different degrees of angularity to said guideway.

60. In a machine for marking buttonholes, a work table, having a guideway, a series of markers therein, an end gage connected to one of the markers and movable therewith in said guideway, and a pivot for said gage about which it is adjustable.

61. In a machine for marking buttonholes, a work table having a guideway, a plurality of markers adjustable longitudinally of said guideway, a block adjustable in said guideway, an end gage pivoted on the block and adjustable about the pivot to lie at different angles to the guideway, and means for holding said gage after adjustment.

62. In a machine for marking buttonholes, a plurality of adjustable buttonhole marking devices, and an end gage carrier connected with said marking devices provided with a relatively movable end gage for the work, said gage being adjustable as to angularity.

63. In a machine for marking buttonholes, a work table having a guideway, a series of markers adjustable in the guideway, a lower end gage, and a movable work-clamping member on said gage for engaging the lower end of the fly.

64. In a machine for marking buttonholes, a work table having a guideway, a series of marking devices adjustable in the guideway, an end gage adjustable longitudinally of the guideway, and a movable work-clamping member mounted on said gage and adjustable therewith to engage the end of the fly.

65. In a machine for marking buttonholes, a curved guideway, marking devices in said guideway, means for moving all of said marking devices simultaneously in the same direction in said guideway, an edge gage adjacent to said guideway and extending parallel therewith, said gage being adjustable transversely of said guideway, and end gages extending across said guideway, one at each end thereof, one of said end gages being connected to and movable with one of the marking devices.

66. In a machine for marking buttonholes, a curved guideway, markers adjustable longitudinally of said guideway, an edge gage adjacent to and extending longitudinally of said guideway and adjustable transversely of said guideway, separated end gages each extending across said guideway and adjustable longitudinally thereof, one of said gages being connected to the end marker, and means for selectively placing a predetermined number of said markers in active position.

67. In a machine for marking buttonholes, a table having a guideway, a cover for one end of the guideway, a plurality of markers, means whereby all of said markers may be moved longitudinally of said guideway to selectively place a predetermined number in inactive position under the cover, and a member for confining the inactive markers in the covered portion of the guideway.

68. In a machine for marking buttonholes, a table having a work-receiving portion, a guideway in said work-receiving portion but extending beyond the same, a plurality of markers, means whereby all of said markers may be moved along said guideway, to selectively place a predetermined number in active position and the remainder in inactive position in the extension of said guideway, and a movable member for confining the inactive markers in said guideway extension.

69. In a machine for marking buttonholes, a plurality of marker bars adjustable toward and from each other, and provided with markers, a work table having a guideway for said markers, and a removable spacer having means for simultaneously moving and spacing a predetermined number of the markers.

70. In a machine for marking buttonholes, a plurality of markers, a bed or platen, mechanism for effecting a relative movement of said markers and said bed or platen, a work clamp, manually-controlled means for closing the clamp, a power shaft, operative connections between said shaft and said mechanism, and operative connections between said shaft and said clamp-closing means.

71. In a machine for marking buttonholes, a fly supporting table having a guideway, a plurality of markers, adjustable longitudinally of the guideway, means whereby the number of said markers to be placed in active position may be selectively varied, a bed or platen, mechanism for effecting a relative movement of said markers and said bed or platen, a work clamp for clamping the work, a clutch-controlled power shaft, and operative connections between said shaft and said clamp and between said shaft and said mechanism.

72. In a machine for marking buttonholes, a fly-supporting table, a plurality of markers, means whereby the number of said markers to be placed in active position may be selectively varied, a bed or platen, mechanism for effecting a relative movement of said markers and said bed or platen, a work clamp, power mechanism for operating the clamp, and manually controlled means for causing the closing of the clamp.

73. In a machine for marking buttonholes, a plurality of markers having upstanding work indenters, a bed or platen normally elevated above and in the rear of the markers so that the work may be placed over the markers, and automatic mechanism for imparting the following movements to said bed or platen, to wit: forward and downward to press the work upon the markers and then upward and rearward.

74. In a machine for marking buttonholes, a plurality of markers having upstanding work indenters, a bed or platen, a slide in which the platen or bed is supported, an oscillatory carrier for the slide, and mechanism for rocking the carrier and reciprocating said slide, whereby the platen will be operated to press upon the markers, work placed thereon.

75. In a machine for marking buttonholes, a table having a guideway, a plurality of markers working in said guideway, means whereby the number of markers retained in active position within said guideway may be selectively varied, a work clamp supported by said table to engage the end of a buttonhole fly to locate the latter relatively to the markers, and manually controlled means for operating the clamp.

76. In a machine for marking buttonholes, a plurality of markers, means for selectively varying the number of said markers to be placed in active position, a work clamp arranged to engage the end of the work, manually-controlled means for opening and closing the clamp, and power mechanism for automatically opening the clamp in the operation of the machine.

77. In a machine for marking buttonholes, a fly supporting table having a guideway, a plurality of markers adjustable in said guideway, means whereby the number of said markers to be placed in active position may be selectively varied, a work clamp arranged on said table to engage the end of a fly, a spring-tension means for closing the clamp, and a handle by which the clamp may be manually opened.

78. In a machine for marking buttonholes, a plurality of markers, means whereby the number of said markers to be placed in active position may be selectively varied, a work-clamp, spring-tension means for normally closing the clamp, a handle for manually opening the clamp, and power mechanism for automatically opening the clamp.

In testimony whereof I have affixed my signature, in presence of two witnesses.

HENRY W. STEDLER.

Witnesses:
LAWRENCE H. COX,
MARCUS B. MAY.

Copies of this patent may be obtained for five cents each, by addressing the "Commissioner of Patents, Washington, D. C."